United States Patent
Schlienger et al.

(10) Patent No.: US 9,540,954 B2
(45) Date of Patent: Jan. 10, 2017

(54) RUPTURE PROTECTION MEANS

(71) Applicant: ABB Turbo Systems AG, Baden (CH)

(72) Inventors: Joel Schlienger, Zurich (CH); Markus Lebong, Niederrohrdorf (CH); Olaf Baudisch, Winterthur (CH); Patrick Aberle, Untersiggenthal (CH)

(73) Assignee: ABB Turbo Systems AG, Baden (CH)

( * ) Notice: Subject to any disclaimer, the term of this patent is extended or adjusted under 35 U.S.C. 154(b) by 619 days.

(21) Appl. No.: 13/873,717

(22) Filed: Apr. 30, 2013

(65) Prior Publication Data

US 2013/0294947 A1    Nov. 7, 2013

Related U.S. Application Data

(63) Continuation of application No. PCT/EP2011/069177, filed on Nov. 1, 2011.

(30) Foreign Application Priority Data

Nov. 1, 2010   (DE) .................. 10 2010 043 198

(51) Int. Cl.
| | | |
|---|---|---|
| *F02C 6/12* | (2006.01) | |
| *F01D 25/24* | (2006.01) | |
| *F01D 21/04* | (2006.01) | |

(52) U.S. Cl.
CPC ............. *F01D 25/24* (2013.01); *F01D 21/045* (2013.01); *F02C 6/12* (2013.01); *F05D 2220/40* (2013.01)

(58) Field of Classification Search
CPC ........ F01D 21/04; F01D 21/045; F01D 21/06; F01D 21/08
See application file for complete search history.

(56) References Cited

U.S. PATENT DOCUMENTS

2005/0175477 A1    8/2005 Kopp et al.

FOREIGN PATENT DOCUMENTS

| EP | 1 353 041 A1 | 10/2003 |
| GB | 2 377 731 A | 1/2003 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated May 16, 2013, issued in corresponding International Application No. PCT/EP2011/069177. (13 pages).

(Continued)

*Primary Examiner* — Patrick Hamo
(74) *Attorney, Agent, or Firm* — Barnes & Thornburg LLP

(57) ABSTRACT

An exemplary arrangement for securing the shaft of an exhaust-gas turbocharger includes a catch ring with a central opening and a radial projection on the shaft. The catch ring having an inner contour in the region of the central opening. The radial projection on the shaft is provided with an outer contour. The inner contour on the catch ring and the outer contour on the shaft are configured such that, during mounting of the shaft and of the turbine wheel connected thereto and in at least one specified angle position of the shaft with respect to the housing, the radially outwardly protruding projection on the shaft can be passed in an axial direction through the central opening of the housing element. The radially outwardly protruding projection abuts in the axial direction against the housing element in specified angle positions of the shaft with respect to the housing.

13 Claims, 6 Drawing Sheets

(56) References Cited

OTHER PUBLICATIONS

International Search Report (PCT/ISA/210) issued on Mar. 23, 2012, by the European Patent Office as the International Searching Authority for International Application No. PCT/EP2011/069177.
Written Opinion (PCT/ISA/237) issued on Mar. 23, 2012, by the European Patent Office as the International Searching Authority for International Application No. PCT/EP2011/069177.

RUPTURE PROTECTION MEANS

RELATED APPLICATION(S)

This application claims priority as a continuation application under 35 U.S.C. §120 to PCT/EP2011/069177, which was filed as an International Application on Nov. 1, 2011 designating the U.S., and which claims priority to German Application 102010043198.2 filed in Germany on Nov. 1, 2010. The entire contents of these applications are hereby incorporated by reference in their entireties.

FIELD

The disclosure relates to the field of exhaust-gas turbochargers for supercharged internal combustion engines. For example, an exhaust-gas turbocharger having a turbine wheel and a compressor wheel which are connected to one another via a shaft, wherein a means for axially securing the shaft and the turbine wheel connected thereto in the event of rupture of the compressor wheel is provided between the compressor wheel and the turbine wheel. The disclosure also relates to a catch ring for axially securing the shaft of an exhaust-gas turbocharger.

BACKGROUND

To increase the power of an internal combustion engine (combustion engine), nowadays it is known to use exhaust-gas turbochargers having a compressor, which supplies air for the combustion process to the combustion chamber of the internal combustion engine, and an exhaust-gas turbine in the exhaust tract of the internal combustion engine. The supercharging of the internal combustion engine increases the amount of air and fuel in the combustion chambers (cylinders), and this can result in a significant increase in power of the internal combustion engine. The exhaust-gas turbocharger used for this purpose is normally composed of a rotor, including (e.g., comprising) a compressor wheel and a turbine wheel and the shaft bearing arrangement, the flow-guiding housing parts (compressor housing, turbine housing), and the bearing housing.

During full-load operation of the internal combustion engine, in the exhaust-gas turbocharger, very high circumferential speeds can be attained at the tip diameters of the turbine and compressor wheel. The maximum admissible rotor rotational speed of an exhaust-gas turbocharger is a function of the wheel size, the geometry and the strength values of the materials used. The rotating components can be subjected to very high centrifugal loads and therefore high material stresses. Defects in the material structure can under some circumstances lead to rupture of the compressor or turbine wheel, with in some cases severe consequences for the housing parts which surround the rotating components. The containment concept of an exhaust-gas turbocharger can basically be interpreted as meaning that all fragments are retained within the external housing and do not pose a risk to the surroundings of the supercharger.

In the event a compressor fails as a result of a compressor wheel breaking apart, the braking torque on the turbocharger rotor is eliminated, whereby the now freely driving turbine is accelerated to excessive rotational speeds, and fails when the natural rupture rotational speed is reached. With regard to the natural rupture of a radial turbine, a distinction is made between two types of rupture.

In the case of hub rupture, the entire hub body including the turbine blades disintegrates into multiple fragments, wherein the full rotational energy of the turbine is released instantaneously. The fragments which accelerate outward with high momentum cause considerable damage to the surrounding housing parts and, in the worst case, can even penetrate through said housing parts and thereby pose a risk to the surroundings of the turbocharger.

On the other hand, the turbine can be designed such that it fails through blade rupture. Here, the turbine blades fail in the root region to the hub body, while the wheel hub of the turbine wheel remains intact, continues to rotate and is braked only by friction against the surrounding housing part. Since, in the case of blade rupture, initially only the turbine blades are detached from the wheel hub, initially only the kinetic energy component of the blades is released to the surroundings. During the course of the run-down, the rest of the rotational energy, that is to say the component in the hub, is released to the housing by the stated friction.

In the case of blade rupture of a radial turbine at the natural rupture rotational speed thereof, there can be the problem that, after the blades are thrown off, residual energy remains in the non-rupturing hub body. Rupture tests have shown that, in the case of blade rupture, the shaft can fails and break apart, between the two radial bearings in the region of the axial bearing. In these situations, the turbine-side part of the shaft together with the hub body of the turbine wheel is no longer adequately secured in an axial direction by the axial bearing arranged at the compressor side of the rupture point, and can emerge from the turbocharger housing in the axial direction and pass into the gas outlet line. Here, the friction-welded connection between the shaft and the turbine hub body remains intact. By contrast, the compressor-side part of the shaft remains blocked in the compressor-side bearing point and does not follow the hub body of the turbine wheel and the shaft stub fastened thereto.

A freely rotating component in the gas outlet lines of the turbine is undesirable because this is uncontrollable and can cause damage to the exhaust lines.

EP 1353 041 A1 discloses an exhaust-gas turbocharger in which, on the shaft which is connected to the turbine wheel, there is arranged a means for axially securing the shaft and the turbine wheel connected thereto. In the event of rupture of the compressor wheel, the securing means prevents an axial movement of the shaft, and of the turbine wheel connected thereto, in the direction of the turbine. The securing means is for example, a circlip which is arranged in a groove in the shaft and which, in the installed state, together with housing parts, forms an axial stop for the shaft. The mounting and dismounting of a shaft secured in this manner in the event of maintenance work is cumbersome.

SUMMARY

An exemplary exhaust-gas turbocharger is disclosed, comprising: a turbine with a turbine wheel and a compressor with a compressor wheel, wherein the turbine wheel and the compressor wheel are connected to one another via a shaft and are arranged in a bearing housing, wherein the shaft is mounted, so as to be rotatable about an axis, through bearings arranged between the turbine wheel and compressor wheel; means for axially securing the shaft and the turbine wheel connected thereto is provided between the compressor wheel and the turbine wheel, wherein said means for axial securing prevents an axial movement of the shaft and of the turbine wheel connected thereto in the direction of the turbine in an event of rupture of the compressor wheel; wherein the means for axially securing the shaft and the turbine wheel connected thereto includes:

a housing element with a central opening, said housing element being provided, in a region of the central opening, with an inner contour in a circumferential direction, and a radial projection on the shaft, said radial projection being provided with an outer contour in a circumferential direction, and wherein the inner contour on the housing element and the outer contour on the shaft are configured to be coordinated with one another such that, during the mounting of the shaft and of the turbine wheel connected thereto, in at least one specified angle position of the shaft with respect to the housing, the radially outwardly protruding projection on the shaft is passed in an axial direction through the central opening of the housing element, and in all angle positions of the shaft with respect to the housing other than the at least one specified angle position of the shaft with respect to the housing, the radially outwardly protruding projection abuts against the housing element when moved in the axial direction.

An exemplary catch ring which can be inserted into a housing of an exhaust-gas turbocharger in order to axially secure a shaft, which is provided with a contoured radial projection, of an exhaust-gas turbocharger is disclosed, the catch ring comprising: a central opening having an inner contour in a circumferential direction, the inner contour being configured such that, in at least one specified angle position of the catch ring with respect to a shaft, which is provided with a contoured radial projection, of an exhaust-gas turbocharger, the catch ring can be passed in an axial direction over a shaft with a radial projection of said type, and in all angle positions of the catch ring with respect to a shaft of said type other than the at least one particular angle position of the catch ring with respect to a shaft of said type, the catch ring abuts in an axial direction against the projection of said type.

An exemplary exhaust-gas turbocharger is disclosed, comprising: a turbine with a turbine wheel and a compressor with a compressor wheel, wherein the turbine wheel and the compressor wheel are connected to one another via a shaft and are arranged in a bearing housing; a catch ring and a radial projection mounted on the shaft and that secure the shaft and the turbine wheel, the catch ring and the radial projection are provided between the compressor wheel and the turbine wheel; wherein the catch ring has a central opening and an inner contour in a region of the central opening, the central opening being arranged in a circumferential direction, wherein the radial projection includes an outer contour in a circumferential direction, and wherein the inner contour on the housing element and the outer contour on the shaft are configured such that during the mounting of the shaft and of the turbine wheel connected to the shaft, in at least one specified angle position of the shaft with respect to the housing, the radially outwardly protruding projection on the shaft is configured to be passed in an axial direction through the central opening of the housing element, and in all angle positions of the shaft with respect to the housing other than the at least one specified angle position of the shaft with respect to the housing, and the radially outwardly protruding projection is configured to abut against the housing element when moved in the axial direction.

BRIEF DESCRIPTION OF THE DRAWINGS

Exemplary embodiments of a rupture concept according to the disclosure for an exhaust-gas turbocharger are described below on the basis of the drawings. Equivalent elements are denoted by the same reference numerals in the various figures, in which.

DETAILED DESCRIPTION

Figure 1:
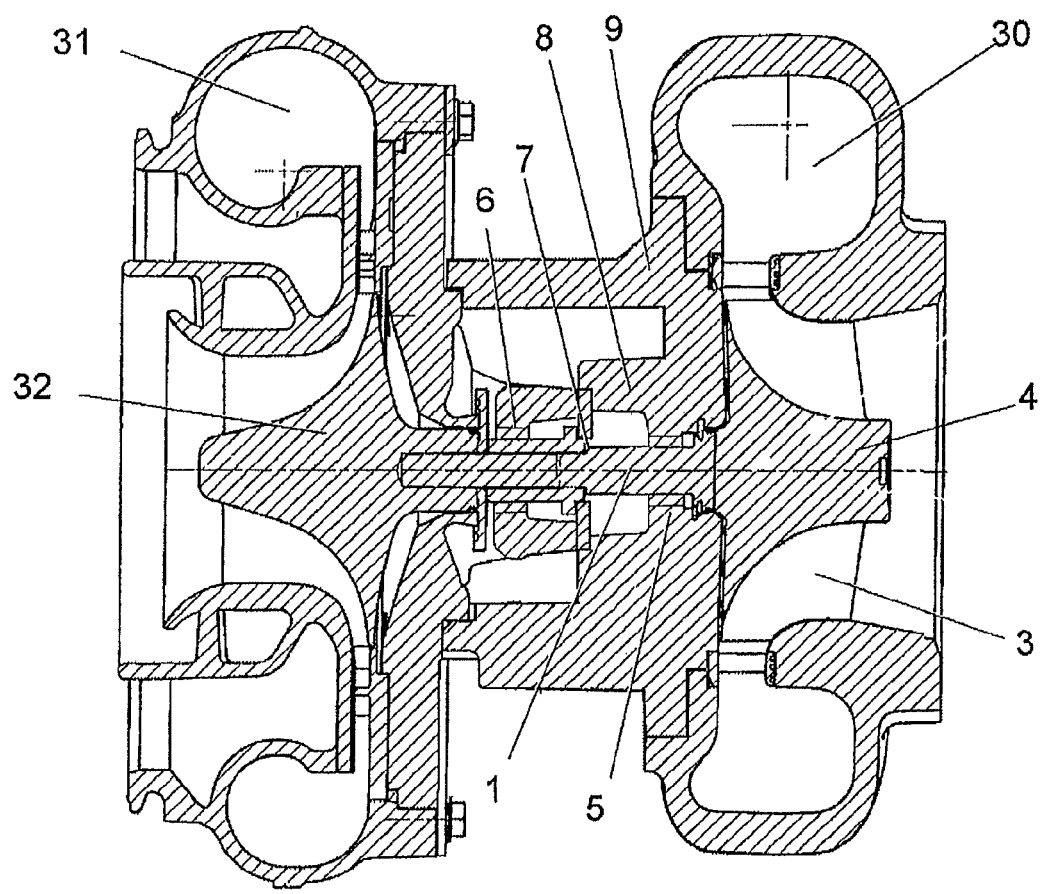
FIG. 1 shows a schematic longitudinal section through known exhaust-gas turbocharger, having a shaft rotatably mounted in a housing and having a turbine wheel connected to said shaft, and also having a compressor wheel mounted on the shaft.

Exemplary embodiments of the present disclosure provide the shaft of the exhaust-gas turbocharger with a securing device which, in the event of shaft failure, can prevent the emergence of the turbine-side shaft stub with the hub body of the turbine wheel fastened thereto, and by means of which the shaft and the turbine wheel can be mounted and dismounted in a simple manner.

An exemplary exhaust-gas turbocharger described in association with the exemplary embodiments of the present disclosure includes a turbine with a turbine wheel and a compressor with a compressor wheel. The turbine wheel and the compressor wheel can be connected to one another via a shaft and are arranged in a bearing housing. The shaft is mounted so as to be rotatable about its axis, wherein the bearings can be arranged between the turbine wheel and compressor wheel. A means for axially securing the shaft and the turbine wheel connected thereto is provided between the compressor wheel and the turbine wheel, wherein said means for axial securing prevents an axial movement of the shaft and of the turbine wheel connected thereto in the direction of the turbine in the event of rupture of the compressor wheel.

According to the disclosure, the means for axially securing the shaft and the turbine wheel connected thereto includes firstly a housing element with a central opening and a radially outwardly protruding projection (radial projection), on the shaft. The housing element is provided, in the region of the central opening, with an inner contour in a circumferential direction. The projection on the shaft is provided with an outer contour in a circumferential direction. The inner contour on the housing element and the outer contour on the shaft are designed to be coordinated with one another such that, during the mounting of the shaft and of the turbine wheel connected thereto, in at least one specified angle position of the shaft with respect to the housing, the radially outwardly protruding projection on the shaft can be passed in an axial direction through the central opening of the housing element, whereas, in all angle positions of the shaft with respect to the housing other than the at least one specified angle position of the shaft with respect to the housing, the radially outwardly protruding projection abuts against the housing element with the central opening when moved in the axial direction.

The parts, formed according to the disclosure as a contour and counterpart contour, of the shaft and of the bearing housing make it possible for the shaft, in the non-rotating state, to be inserted into the bearing housing or removed from the bearing housing in a simple manner. Here, the shaft is moved axially when the radial projection is in the specified angle position in which the outer contour on the radial projection is aligned with the inner contour on the housing element.

By contrast, during operation at high rotational speeds or in the event of rupture, owing to the only extremely brief angle position alignment between the inner contour and the outer contour, the shaft cannot move in the axial direction without considerable material abrasion. Owing to the high circumferential speed of the rotating outer contour of the shaft and owing to the fact that the shaft scarcely moves as viewed in the axial direction, a penetration of the outer contour through the inner contours of the axial securing means is not possible without material abrasion. Here, the axial movement speed of the shaft would have to be several times higher than its circumferential speed in order to permit penetration. It is thus possible, through the targeted axial arresting of the shaft and of the turbine wheel connected thereto, for the rotor to be secured within the turbocharger casing by means of a controlled rundown, whereby the remaining rupture energy can be released slowly and no load is exerted on the gas outlet line.

In an exemplary embodiment of the present disclosure, the inner contour and the outer contour are divided in each case into a number of repeating contour segments, such that, in a number of angle positions of the shaft with respect to the housing corresponding to the number of repeating segments, the radially outwardly protruding projection can be passed in an axial direction through the housing element which extends to the shaft, and, in all other angle positions of the shaft with respect to the housing, the radially outwardly protruding projection is blocked in the axial direction by the housing element which extends radially to the shaft.

This symmetry of the arrangement permits simplified mounting and dismounting, because the shaft can be installed and removed in the axial direction in a plurality of angle positions with respect to the housing.

The inner contour and the outer contour can include in each case at least one cam and in each case at least one groove, wherein cam and groove are defined such that, in the inner contour of the housing element, a cam denotes a portion which has a smaller inner radius than a portion denoted as a groove, and in the outer contour on the radial projection of the shaft, a cam denotes a portion which has a larger outer radius than a portion denoted as a groove. This embodiment encompasses for example the design of the securing means as an externally toothed wheel and an internally toothed wheel, having a corresponding number of intermeshing teeth, wherein a gap (groove) is formed in each case between two teeth.

The cams on the radial projection of the shaft are advantageously formed so as to be slightly larger than the cams on the housing part, because in the event of rupture, a considerable amount of material can be abraded. The risk of premature failure of the axial securing means can optionally be reduced by virtue of the ratio of the cam volume of the shaft to the cam volume of the housing element being, for example, specified as 2:1, or even 3:1.

The housing element optionally has, on at least one axial face side, surfaces which serve as an axial stop and which are at least partially provided with a chamfer. The chamfer serves as a stop bevel and, in the event of rupture, reduces the material loads at the edges of the inner contour and of the outer contour which impact against one another.

The housing element which is part of the means for axially securing the shaft and the turbine wheel connected thereto can optionally be formed as a separate housing insert piece which can be introduced in an axial direction into the bearing housing. The housing insert piece can for example be of annular form, in the form of a catch ring, which bears axially and radially against the bearing housing and is thus precisely positioned and centered with respect to the shaft.

With this concept, it is possible to dispense with additional axial shaft securing means (e.g., safety rings), which considerably simplifies the dismounting and mounting of the shaft.

FIG. 1 shows a schematic longitudinal section through known exhaust-gas turbocharger, having a shaft rotatably mounted in a housing and having a turbine wheel connected to said shaft, and also having a compressor wheel mounted on the shaft. As shown in FIG. 1, the radial turbine includes a turbine wheel with a hub body 4 and with rotor blades 3 fastened thereto. The turbine wheel is fastened to or formed in one piece with the shaft 1. The turbine housing 30 surrounds the turbine wheel and limits the flow ducts which conduct the hot exhaust gas from the internal combustion engine via the turbine wheel to the exhaust systems. The radial compressor includes a compressor wheel 32 which is likewise fastened to the shaft 8. The compressor housing 31 delimits the compressor-side flow ducts and can be composed of multiple housing parts.

It is the intention, if the shaft 1 fails between the radial bearing points 5 and 6 in the region of the axial bearing 7 in the event of blade rupture of the turbine blades 3, for the turbine-side part of the shaft stub and the hub body 4 connected thereto to be axially secured by means (e.g., component) of a corresponding device, and for an emergence of the parts into the gas outlet to be prevented.

An exemplary embodiment of the means according to the disclosure for axially securing the shaft and the turbine wheel connected thereto, for a turbine-side rupture concept of an exhaust-gas turbocharger in the event of blade rupture, includes the device illustrated in FIGS. 2-4 and explained below.

Figure 2:
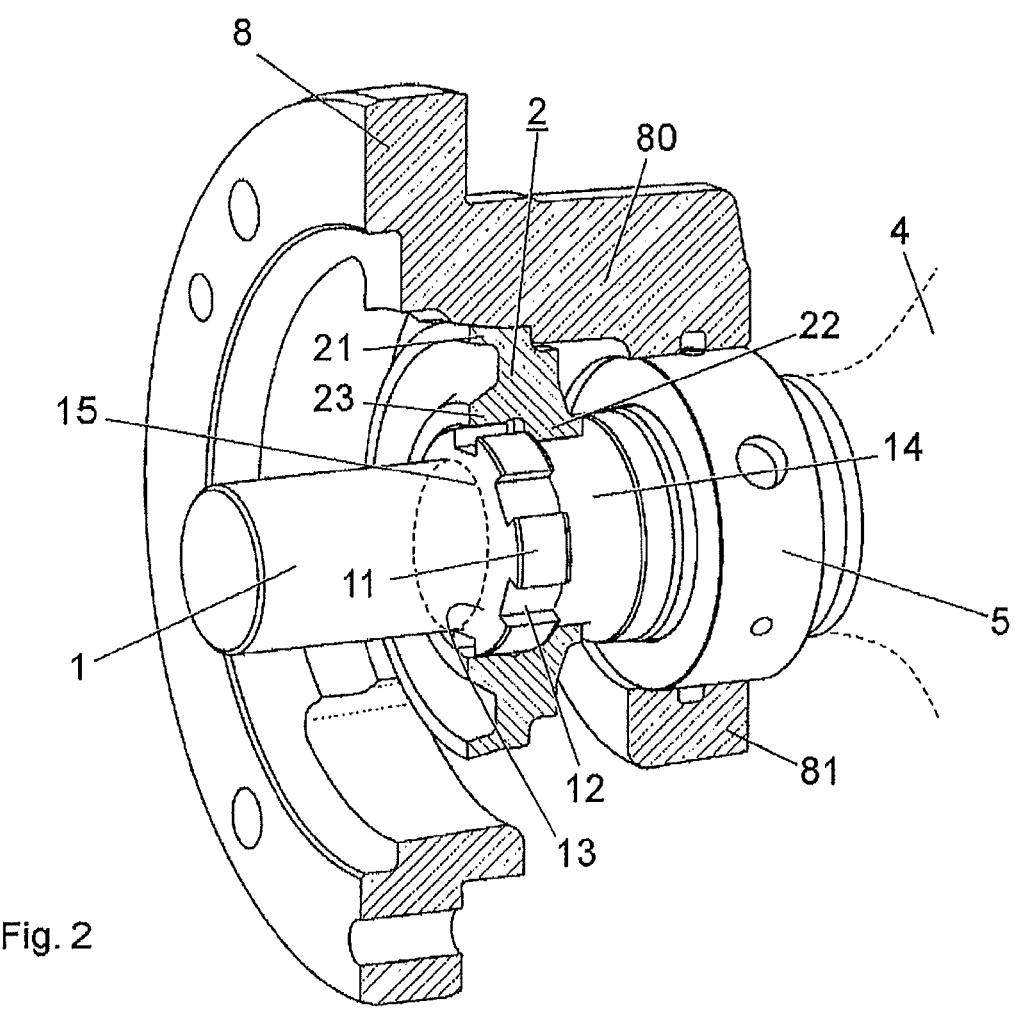
FIG. 2 shows a side view a first arrangement for axially securing the shaft and the turbine wheel connected thereto, having a catch ring arranged in a housing in accordance with an exemplary embodiment of the present disclosure.

FIG. 2 shows a side view a first arrangement for axially securing the shaft and the turbine wheel connected thereto, having a catch ring arranged in a housing in accordance with an exemplary embodiment of the present disclosure. FIG. 3 shows an axial view of the arrangement for axially securing the shaft and the turbine wheel connected thereto as shown in FIG. 2 in accordance with an exemplary embodiment of the present disclosure. FIG. 4 shows an isometric view of the catch ring as shown in FIG. 2 in accordance with an exemplary embodiment of the present disclosure.

Figure 3:
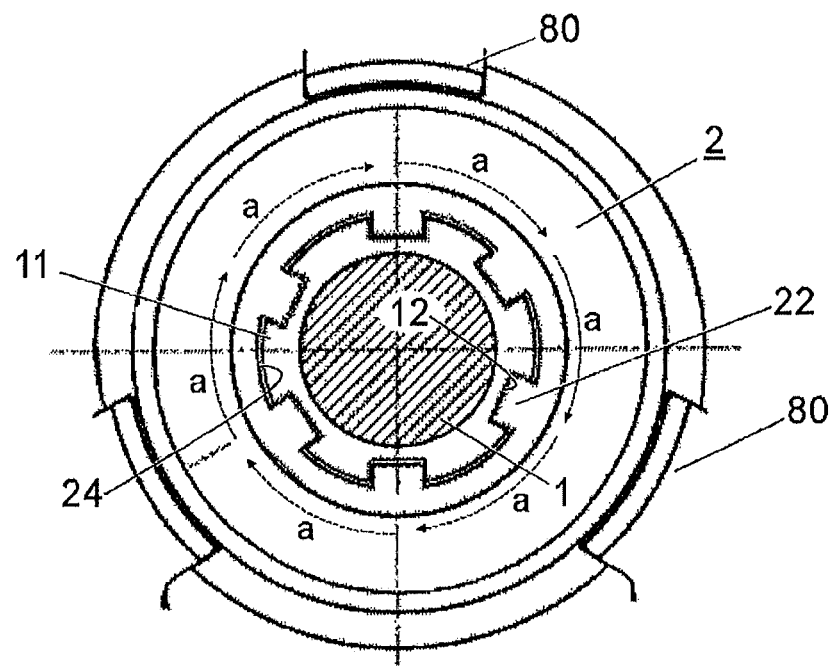
FIG. 3 shows an axial view of the arrangement for axially securing the shaft and the turbine wheel connected thereto as shown in FIG. 2 in accordance with an exemplary embodiment of the present disclosure.
Figure 4:
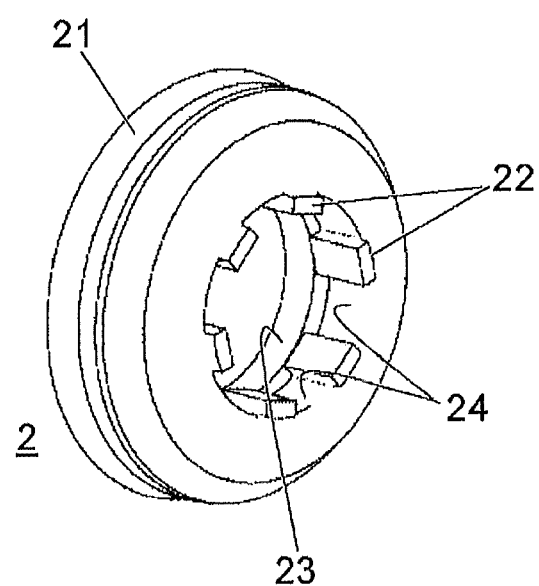
FIG. 4 shows an isometric view of the catch ring as shown in FIG. 2 in accordance with an exemplary embodiment of the present disclosure.

As shown in FIGS. 2-4, the device according to the disclosure is composed of a catch ring 2 and a radially outwardly protruding projection (radial projection) on the shaft. The radial projection has an outer contour along the circumference, which includes regions of different radial outer dimension, in the exemplary cams 11 and grooves 12. The catch ring 2, which as a housing insert piece is connected in a positively locking or non-positively locking manner to a flange 80 of the bearing housing 8, has, as per FIG. 3, a central opening through which the shaft 1 can be passed in an axial direction. In the region of said opening, the catch ring 2 has an inner contour along the circumference, that is to say, along the circumference, comprises regions with different radial inner dimension, in the concrete example likewise cams 22 and grooves 24.

The inner contour on the catch ring 2 can be coordinated with the outer contour on the radial projection of the shaft 1, such that, with the radial projection in a particular angle position (orientation in the circumferential direction) with respect to the catch ring 2, the shaft 1 can be passed through the opening in the catch ring, whereas in all other angle positions, the radially inwardly protruding projections of the inner contour on the catch ring and the radially outwardly protruding projections of the outer contour on the shaft prevent an axial relative movement of the shaft and catch ring.

If, as in the present case, the two contours exhibit symmetry with a plurality of repeating contour segments a, there are a plurality of particular angle positions in which the two parts can be moved relative to one another in the axial direction. As can be seen from FIG. 3, in said first embodiment, the cams 22 of the catch ring 2 pass into the grooves 12 in the radial projection of the shaft 1 in at least six angle positions of the shaft with respect to the catch ring.

During mounting, the shaft 1 is passed through the catch ring 2 from the turbine side (from the right in FIG. 2) toward the compressor side (to the left) until the shaft abuts with the radial projection against the turbine-side end face of the catch ring. It is now desirable to adjust the particular angle position of the shaft with respect to the catch ring in order that the shaft 1 can pass with the cams 11 on the radial projection through the grooves 24 in the catch ring 2. When the cams 11 have passed all the way through the grooves 24 in the catch ring 2 in the axial direction, said cams pass into a region of the shaft with an encircling groove, wherein the groove is formed as an undercut 14 with respect to the radial projection with the cams and grooves, such that the maximum radial extent in the region of the undercut is smaller than the minimum inner radius of the catch ring in the region of the inner contour in the central opening.

On the compressor-side end face, the cams 22 of the catch ring 2 advantageously have stop surfaces running perpendicular to the axis, which stop surfaces serve as a large-area axial stop in the event of abutment against the cams 11 of the shaft 1.

In another exemplary embodiment, the device according to the disclosure again has the catch ring 2 with a contoured central opening and a contoured radial projection.

Figure 5:
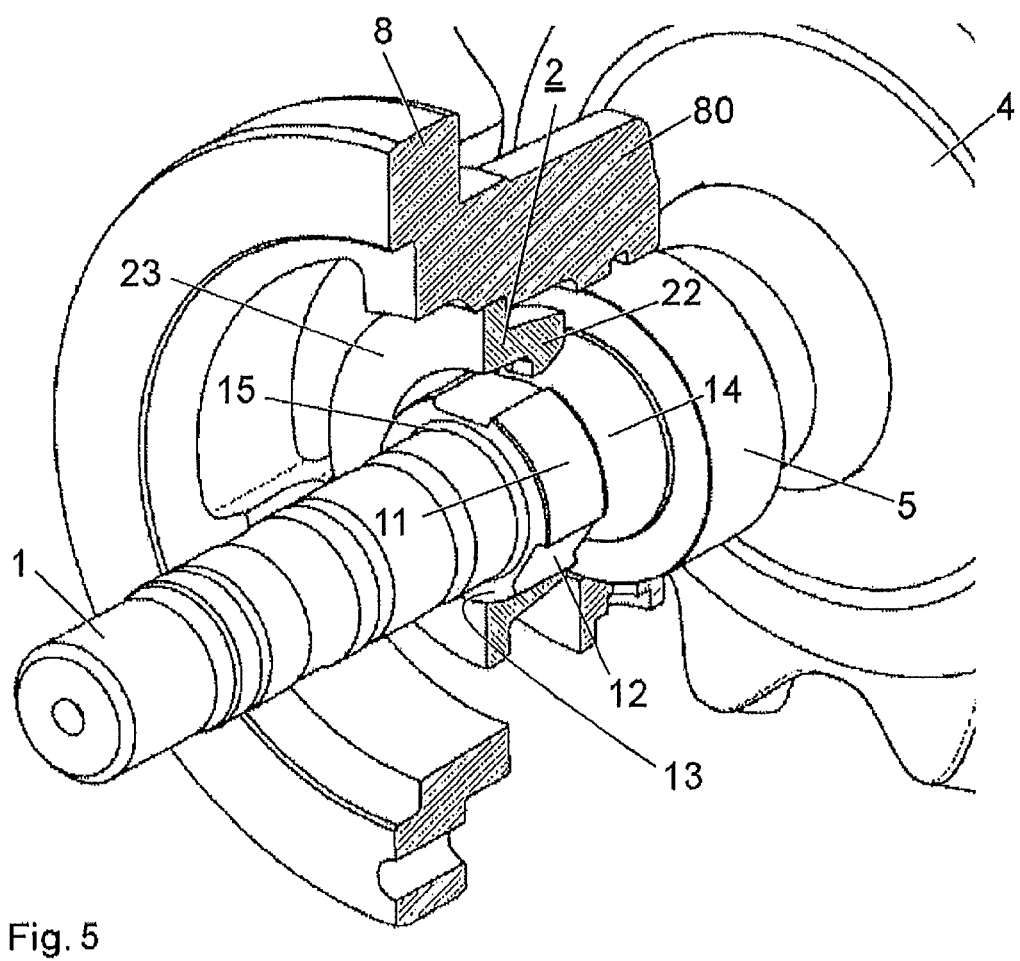
FIG. 5 shows a side view of a second arrangement for axially securing the shaft and the turbine wheel connected thereto, having a catch ring arranged in the housing in accordance with an exemplary embodiment of the present disclosure.
Figure 6:
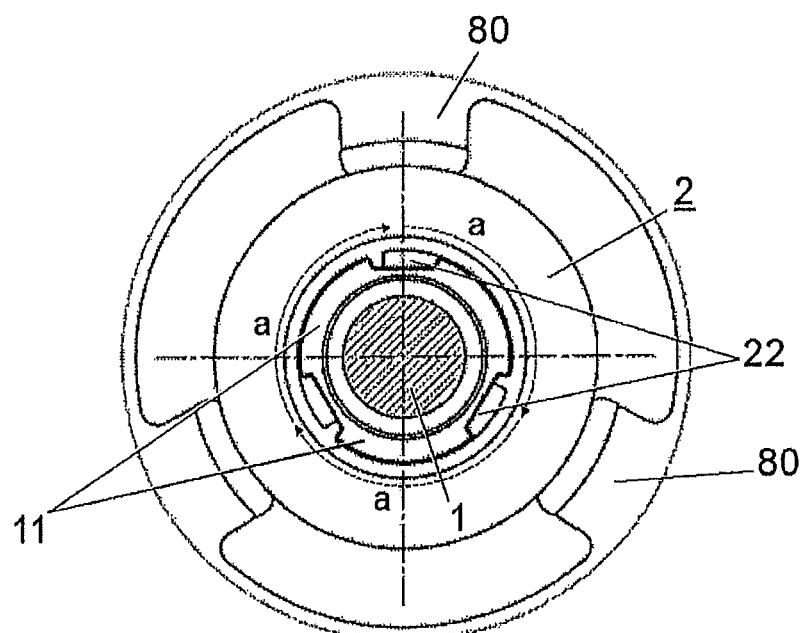
FIG. 6 shows an axial view of the means for axially securing the shaft and the turbine wheel connected thereto as per FIG. 5 in accordance with an exemplary embodiment of the present disclosure.
Figure 7:
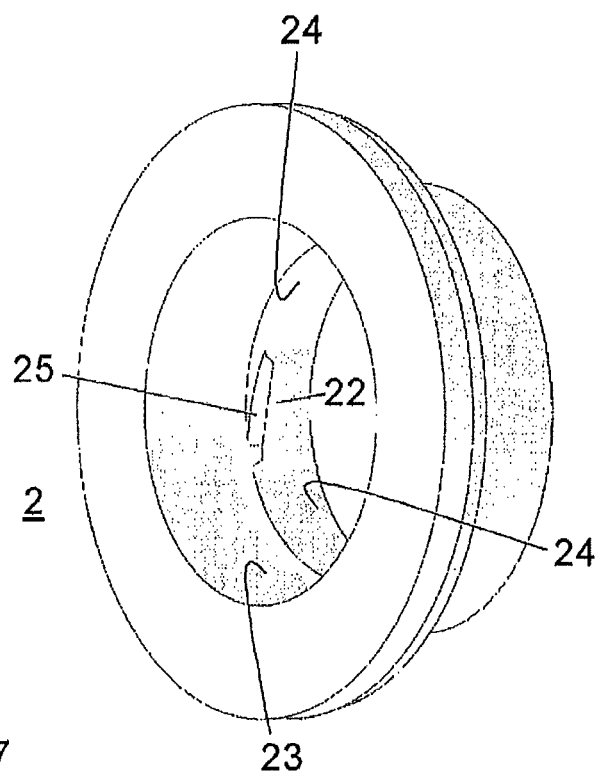
FIG. 7 shows an isometric view of the catch ring as per FIG. 5 in accordance with an exemplary embodiment of the present disclosure.
Figure 8:
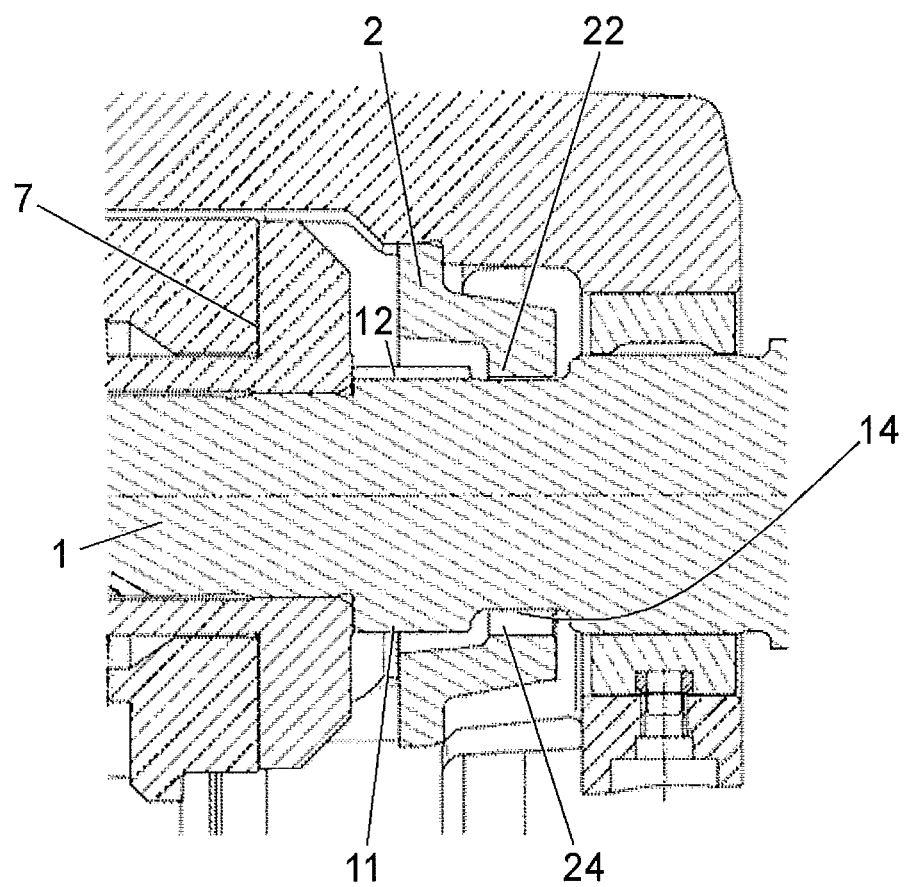
FIG. 8 shows a longitudinal section through the means for axially securing the shaft and the turbine wheel connected thereto as per FIG. 5 in accordance with an exemplary embodiment of the present disclosure.

FIG. 5 shows a side view of a second arrangement for axially securing the shaft and the turbine wheel connected thereto, having a catch ring arranged in the housing in accordance with an exemplary embodiment of the present disclosure. FIG. 6 shows an axial view of the means for axially securing the shaft and the turbine wheel connected thereto as per FIG. 5 in accordance with an exemplary embodiment of the present disclosure. FIG. 7 shows an isometric view of the catch ring as per FIG. 5 in accordance with an exemplary embodiment of the present disclosure. FIG. 8 shows a longitudinal section through the means for axially securing the shaft and the turbine wheel connected thereto as per FIG. 5 in accordance with an exemplary embodiment of the present disclosure.

As shown, the shaft 1 again has an undercut 14 in the region between the radial projection and the turbine wheel, into which undercut the cams 22 of the catch ring 2 engage and thereby axially secure the shaft 1. In this embodiment, the catch ring 2 has three cams 22 distributed over the circumference, and an encircling support ring 23. The support ring is formed as a solid ring which, in the event of rupture, holds the catch ring together, supports it against the housing and stabilizes it.

Again, the outer contour of the shaft and the inner contour of the catch ring are formed so as to be coordinated with one another such that, in a suitable angle position, the two geometries can pass through one another, as a result of axial movement of the shaft, for the purpose of mounting and dismounting. In this case, the shaft 1 can pass axially through the catch ring 2 in at least three specified angle positions.

According to the disclosure, in the operating state of the exhaust-gas turbocharger, the rotating shaft 1 cannot be pulled out of the catch ring 2 without material abrasion, whereby the shaft is axially secured during operation. In particular at high rotational speeds, threading of the shaft 1 out of the catch ring 2 is improbable. The cams 22 of the catch ring 2 would have to pass through the rotating grooves 12 of the shaft at the correct time and at an enormously high axial speed in order to permit an emergence without material abrasion. This behavior has not been observed in rupture tests performed to date.

By contrast, mounting and dismounting of the shaft as per the above description is possible in a standstill state by virtue of the shaft and catch ring being moved into a particular angle position with respect to one another. FIG. 8 shows, in a sectional illustration, the device according to the disclosure in said angle position of the shaft with respect to the catch ring, in which the relative axial movement is possible.

The cams 22 of the catch ring 2 optionally have chamfers 25 of, for example, 10° to 15° as stop bevels in the region of the compressor-side stop surfaces, that is to say in the region in which contact between the two parts occurs in the event of rupture. Said chamfers reduce the impact when the cam face sides of the shaft abut against the cam face sides of the catch ring. Directly after the rupture of the turbine, the cam flanks of the shaft 1 impact against the cam flanks of the cams 22 on the catch ring, but then slide along the chamfers 25 of the cams on the catch ring 2 and thereby reduce the material loadings in the phase of interaction between the shaft and catch ring.

After a turbine rupture, the cams and grooves can exhibit considerable material abrasion, for which reason the cam geometries should not be formed so as to be too small. A cam volume of the shaft part should optimally be 2 to 3 times the size of the catch ring cams. The cam volume is measured over the entire circumference and is dependent on the axial length of the cams, the radial height, and the width in the circumferential direction.

In both of the illustrated exemplary embodiments, the catch ring 2 is pressed into the turbine-side bearing flange 80 of the bearing housing 8. The catch ring is precisely positioned in the axial direction by means of an axial stop and is centered with respect to the shaft by means of a centering ring 21. Optionally, the catch ring can, as a housing component, also be formed in one piece with the bearing flange 80 or with the entire bearing housing 8.

Suitable materials for the shaft and for the catch ring are alloy steels which exhibit high elongation at failure (e.g., >10%) and high strength, wherein the parts should not be hardened in order that they do not fail through brittle fracture in the event of rupture.

The radial play between the radially protruding cams of the catch ring 22 and the counterpart contour on the shaft in the region of the undercut 14 should be dimensioned such that there is no additional plain bearing action on the shaft. The axial play between the cams of the catch ring and the cams on the radial projection of the shaft should be dimensioned such that no mutual contact occurs during normal operation of the exhaust-gas turbocharger and during the axial rotor movements that can occur then. Furthermore, the ingress of lubricating oil into the catch device should, for the benefit of small mechanical bearing losses, be minimized.

In addition to the exemplary solutions, described in detail and illustrated in the figures, with opposing cams and grooves of rectangular profile, other inner contours and outer contours coordinated with one another can also be provided.

An advantage of the device according to the disclosure lies in the simple mounting and dismounting of the shaft in a standstill state without additional securing elements which hinder dismounting or mounting of the shaft even when the rotor is at a standstill. With this concept according to the disclosure, axial shaft securing is provided only in the event of rupture and during rotation. During normal operation, said device has no effect on the rotational behavior of the rotor.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

1 Turbocharger shaft
2 Catch ring/housing insert piece (housing element which extends radially to the shaft)
3 Rotor blades of the turbine wheel
4 Hub body of the turbine wheel
5 Turbine-side radial bearing
6 Compressor-side radial bearing
7 Axial bearing
8 Flange of the bearing housing
9 Bearing housing
11 Cams of the shaft (part of the outer contour on the radial projection of the shaft)
12 Grooves in the shaft (part of the outer contour on the radial projection of the shaft)
13 Stop for axial bearing
14 Circumferential groove, undercut
15 Predetermined breaking point
21 Centering ring on the catch ring
22 Cams of the catch ring/housing insert piece (part of the inner contour on the catch ring/housing insert piece)
23 Support ring on the catch ring/housing insert piece
24 Grooves in the catch ring/housing insert piece (part of the inner contour on the catch ring/housing insert piece)
25 Chamfer (stop bevel) on the contact side of the cams in the catch ring/housing insert piece
30 Turbine housing
31 Compressor housing
32 Compressor wheel
80, 81 Flange of the bearing housing

What is claimed is:

1. An exhaust-gas turbocharger, comprising:
   a turbine with a turbine wheel and a compressor with a compressor wheel, wherein the turbine wheel and the compressor wheel are connected to one another via a shaft arranged in a bearing housing, wherein the shaft is mounted, so as to be rotatable about an axis, through bearings arranged between the turbine wheel and compressor wheel;
   means for axially securing the shaft and the turbine wheel connected thereto is provided between the compressor wheel and the turbine wheel, wherein said means for axial securing prevents an axial movement of the shaft and of the turbine wheel connected thereto in the direction of the turbine in an event of rupture of the compressor wheel;
   wherein the means for axially securing the shaft and the turbine wheel connected thereto includes:
      a housing element with a central opening, said housing element being provided, in a region of the central opening, with an inner contour in a circumferential direction, and
      a radial projection on the shaft, said radial projection being provided with an outer contour in a circumferential direction, and
      wherein the inner contour on the housing element and the outer contour on the shaft are configured to be coordinated with one another such that, during the mounting of the shaft and of the turbine wheel connected thereto, in at least one specified angle position of the shaft with respect to the housing, the radially outwardly protruding projection on the shaft is passed in an axial direction through the central opening of the housing element, and in all angle positions of the shaft with respect to the housing other than the at least one specified angle position of the shaft with respect to the housing, the radially outwardly protruding projection abuts against the housing element when moved in the axial direction.

2. The exhaust-gas turbocharger as claimed in claim 1, wherein the inner contour and the outer contour are divided in each case into a number of repeating contour segments, such that in a number of angle positions of the shaft with respect to the housing corresponding to the number of repeating segments, the radially outwardly protruding projection can be passed in an axial direction through the housing element, and in all other angle positions of the shaft with respect to the housing, the radially outwardly protruding projection abuts in the axial direction against the housing.

3. The exhaust-gas turbocharger as claimed in claim 1, wherein the inner contour and the outer contour include in each case at least one cam and in each case at least one groove, wherein in the inner contour a cam denotes a portion which has a smaller inner radius than a portion denoted as a groove, and in the outer contour a cam denotes a portion which has a larger outer radius than a portion denoted as a groove.

4. The exhaust-gas turbocharger as claimed in claim 3, wherein, as viewed over the entire circumference, the ratio of the volume of the cam of the outer contour to the volume of the cam of the inner contour is least 2:1.

5. The exhaust-gas turbocharger as claimed in claim 3, wherein, as viewed over the entire, circumference, the ratio of the volume of the cam of the outer contour to the volume of the cam of the inner contour is least 3:1.

6. The exhaust-gas turbocharger as claimed in claim 1, wherein the housing element which extends to the shaft is formed as a housing insert piece which can be introduced in an axial direction into the bearing housing.

7. The exhaust-gas turbocharger as claimed in claim 6, wherein the housing insert piece is of annular form and bears axially and radially against the bearing housing.

8. A catch ring which can be inserted into the bearing housing of the exhaust-gas turbocharger as claimed in claim 1, the catch ring corresponding to the means for axially securing the shaft and the turbine wheel connected thereto, the shaft being provided with a contoured radial projection, the catch ring comprising:
the central opening having the inner contour in the circumferential direction,
the inner contour being configured such that, in the at least one specified angle position of the catch ring with respect to the shaft, which is provided with the contoured radial projection, the catch ring can be passed in the axial direction over the shaft with the radial projection, and in all angle positions of the catch ring with respect to the shaft other than the at least one particular angle position of the catch ring with respect to the shaft, the catch ring abuts in the axial direction against the radial projection.

9. The catch ring as claimed in claim 8, wherein the inner contour includes at least one cam and at least one groove, wherein the at least one cam and the at least one groove are defined such that the at least one cam denotes a portion which has a smaller inner radius than a portion denoted as the at least one groove.

10. The catch ring as claimed in claim 8, wherein the catch ring has, on at least one axial face side, surfaces which serve as an axial stop and which are provided at least partially with a chamfer.

11. An exhaust-gas turbocharger, comprising:
a turbine with a turbine wheel and a compressor with a compressor wheel, wherein the turbine wheel and the compressor wheel are connected to one another via a shaft arranged in a bearing housing;
a catch ring and a radial projection mounted on the shaft and that secure the shaft and the turbine wheel, the catch ring and the radial projection are provided between the compressor wheel and the turbine wheel;
wherein the catch ring has a central opening and an inner contour in a region of the central opening, the central opening being arranged in a circumferential direction,
wherein the radial projection includes an outer contour in a circumferential direction, and
wherein the inner contour on the housing element and the outer contour on the shaft are configured such that during the mounting of the shaft and of the turbine wheel connected to the shaft, in at least one specified angle position of the shaft with respect to the housing, the radially outwardly protruding projection on the shaft is configured to be passed in an axial direction through the central opening of the housing element, and in all angle positions of the shaft with respect to the housing other than the at least one specified angle position of the shaft with respect to the housing, and the radially outwardly protruding projection is configured to abut against the housing element when moved in the axial direction.

12. The exhaust-gas turbocharger as claimed in claim 1, wherein the shaft is mounted so that it is rotatable about an axis through bearings arranged between the turbine wheel and compressor wheel.

13. The exhaust-gas turbocharger of as claimed in claim 1, wherein the catch ring and radial projection of the shaft are configured to prevent an axial movement of the shaft and of the turbine wheel connected to the shaft in the direction of the turbine in an event the compressor wheel ruptures.

\* \* \* \* \*